United States Patent [19]

LiVolsi

[11] Patent Number: 4,547,953
[45] Date of Patent: Oct. 22, 1985

[54] METHOD OF MAKING A WIRE REINFORCED HOSE CONSTRUCTION INCORPORATING A HOSE CLAMP

[75] Inventor: William J. LiVolsi, Upper Makefield County, Pa.

[73] Assignee: Dayco Corporation, Dayton, Ohio

[21] Appl. No.: 638,801

[22] Filed: Aug. 8, 1984

Related U.S. Application Data

[62] Division of Ser. No. 421,180, Sep. 22, 1982, Pat. No. 4,483,556.

[51] Int. Cl.$^4$ .............................................. B23P 11/02
[52] U.S. Cl. .................... 29/453; 29/526 R
[58] Field of Search ............................ 29/526 R, 453; 24/16 PB, 20 TT, 16 R, 20 R, 484; 285/236, DIG. 4, 253, 242, 244; 403/318, 373; 248/74.3

[56] References Cited

U.S. PATENT DOCUMENTS

| | | | |
|---|---|---|---|
| 1,804,725 | 5/1931 | Walker | 24/20 TT |
| 3,365,218 | 1/1968 | Denyes | 285/253 |
| 3,819,139 | 6/1974 | Jemison | 24/16 PB X |
| 3,837,047 | 9/1974 | Bunnell | 24/16 PB |
| 3,874,712 | 4/1975 | Watson | 285/236 |
| 3,944,265 | 3/1976 | Hiemstra et al. | 29/526 R X |
| 3,983,603 | 10/1976 | Joyce | 24/16 PB |
| 4,045,843 | 9/1977 | Loose et al. | 24/16 PB |
| 4,101,151 | 7/1978 | Ferguson | 285/236 |
| 4,214,351 | 7/1980 | Wenk | 24/484 |
| 4,306,740 | 12/1981 | Kleykamp | 285/236 X |
| 4,312,525 | 1/1982 | Kleykamp | 24/20 TT X |
| 4,453,289 | 6/1984 | Kleykamp et al. | 24/20 TT |

*Primary Examiner*—Charlie T. Moon
*Attorney, Agent, or Firm*—Joseph V. Tassone

[57] ABSTRACT

A hose construction, a hose clamp structure and methods of making the same are provided, the hose construction comprising a hose made primarily of polymeric material and having a reinforcing wire, and an outer hose clamp structure connected to the hose and having two ends which when interconnected together are adapted to secure the hose onto a member telescoped in the hose by tightly engaging a substantially annular portion of the hose around the member. The hose clamp structure has a groove therein that nestably receives part of the reinforcing wire therein. Fastening members secure the nested part of the reinforcing wire to the hose clamp structure whereby the fastening members connect the hose clamp structure to the hose.

12 Claims, 12 Drawing Figures

4,547,953

METHOD OF MAKING A WIRE REINFORCED HOSE CONSTRUCTION INCORPORATING A HOSE CLAMP

This is a division of application Ser. No. 421,180, filed Sept. 22, 1982, now U.S. Pat. No. 4,483,556.

BACKGROUND OF THE INVENTION

1. Field of the Invention

This invention relates to an improved hose construction and to an improved hose clamp structure therefor as well as to improved methods of making such a hose construction and hose clamp structure.

2. Prior Art Statement

It is known to provide a hose construction comprising a hose made primarily of polymeric material and having reinforcing wire means, and an outer hose clamp structure connected to the hose and having two ends which when interconnected together are adapted to secure the hose onto a member telescoped in the hose by tightly engaging a substantially annular portion of the hose around the member. For example, see the U.S. Pat. to Wenk, No. 4,214,351.

It is also known to provide a groove in the inside surface of a hose clamp structure in such a manner that the groove defines a projecting rib on the outside surface of the hose clamp structure and a trough in the inside surface thereof. For example, see the U.S. Pat. to Walker, No. 1,804,725.

It is also known to provide a hose construction comprising a hose made primarily of polymeric material, and a hose clamp structure connected to the hose and having two ends which when interconnected together are adapted to secure the hose onto a member telescoped in the hose by tightly engaging a substantially annular portion of the hose around the member, one of the two ends of the hose clamp structure having an opening means therethrough and teeth-like means adjacent the opening means and the other of the two ends of the hose clamp structure being laced through the opening means in a generally circumferential direction relative to the hose and having teeth-like means interlocked in a ratchet-like manner with the teeth-like means of the one end to interconnect the ends together. For example, see the aforementioned patents to Wenk, No. 4,214,351 and to Walker, No. 1,804,725.

Such prior known hose construction features as set forth above are also provided by the prior known hose clamp structure set forth in the drawings of this application and which has been modified to incorporate the features of this invention, namely the providing of a groove means in the hose clamp structure and/or a locking projection on one of the ends thereof to tend to prevent unlacing of that end from the opening means in the other end of the hose clamp structure as will be apparent hereinafter.

SUMMARY OF THE INVENTION

It is one feature of this invention to provide an improved hose construction that can be readily secured onto a member telescoped therein by having an outer hose clamp structure that is connected to the hose tightly engage a substantially annular portion of the hose around the member when the two ends of the hose clamp structure are interconnected together.

In particular, it was found according to the teachings of this invention that such a hose clamp structure can be effectively secured to the hose by nestably receiving part of the reinforcing wire means of the hose in a groove means formed in the hose clamp structure so that fastening means can secure that part of the reinforcing wire means to the hose clamp structure to connect the hose clamp structure to the hose.

For example, one embodiment of this invention provides a hose construction comprising a hose made primarily of polymeric material and having reinforcing wire means comprising a wire helically disposed along the hose, and an outer hose clamp structure connected to the hose and comprising a one-piece member having two opposed ends which when interconnected together define an annular band around the hose and are adapted to secure the hose onto a member telescoped in the hose by tightly engaging a substantially annular portion of the hose around the member. The hose clamp structure has groove means therein that nestably receives part of the reinforcing wire means therein. Fastening means secures that part of the reinforcing wire means to the hose clamp structure whereby the fastening means connect the hose clamp structure to the hose, the fastening means comprising at least two fastening members respectively disposed adjacent the opposed ends of the hose clamp structure. The groove means extends at least from one of the fastening members to the other of the fastening members and the part of the reinforcing wire means is nestably received in the groove means from at least the one fastening member to the other fastening member.

It is another feature of this invention to provide a hose construction wherein the hose clamp structure connected thereto has means to tend to prevent the unlacing of one end of the hose clamp structure from the opening means in the other end of the hose clamp structure and through which the one end was laced to interconnect the two ends together.

In particular, it was found according to the teachings of this invention that the lacing end of the hose clamp structure can be provided with a projection that extends in a generally radially outwardly direction relative to the hose to lock in an abutting manner with the other end of the hose clamp structure to tend to prevent unlacing of the lacing end from the opening means in a circumferential direction.

For example, another embodiment of this invention provides a hose construction comprising a hose made primarily of polymeric material, and a hose clamp structure connected to the hose and having two ends which when interconnected together are adapted to secure the hose onto a member telescoped in the hose by tightly engaging a substantially annular portion of said hose around the member, one of the two ends of the hose clamp structure having an opening means therethrough and teeth-like means adjacent the opening means and the other of the two ends of the hose clamp structure being laced through the opening means in a generally circumferential direction relative to the hose and having teeth-like means interlocked in a ratchet-like manner with the teeth-like means of the one end to interconnect the ends together. The other end of the hose clamp structure has a projection extending in a generally radially outwardly direction relative to the hose to lock in an abutting manner with the one end to tend to prevent unlacing of the other end from the opening means in the circumferential direction.

Accordingly, it is an object of this invention to provide an improved hose construction having one or more of the novel features of this invention as set forth above or hereinafter shown or described.

Another object of this invention is to provide an improved method of making a hose construction, the method of this invention having one or more of the novel features of this invention as set forth above or hereinafter shown or described.

Other objects of this invention are to provide an improved hose clamp structure and method of making the same, the hose clamp structure and method of this invention each having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
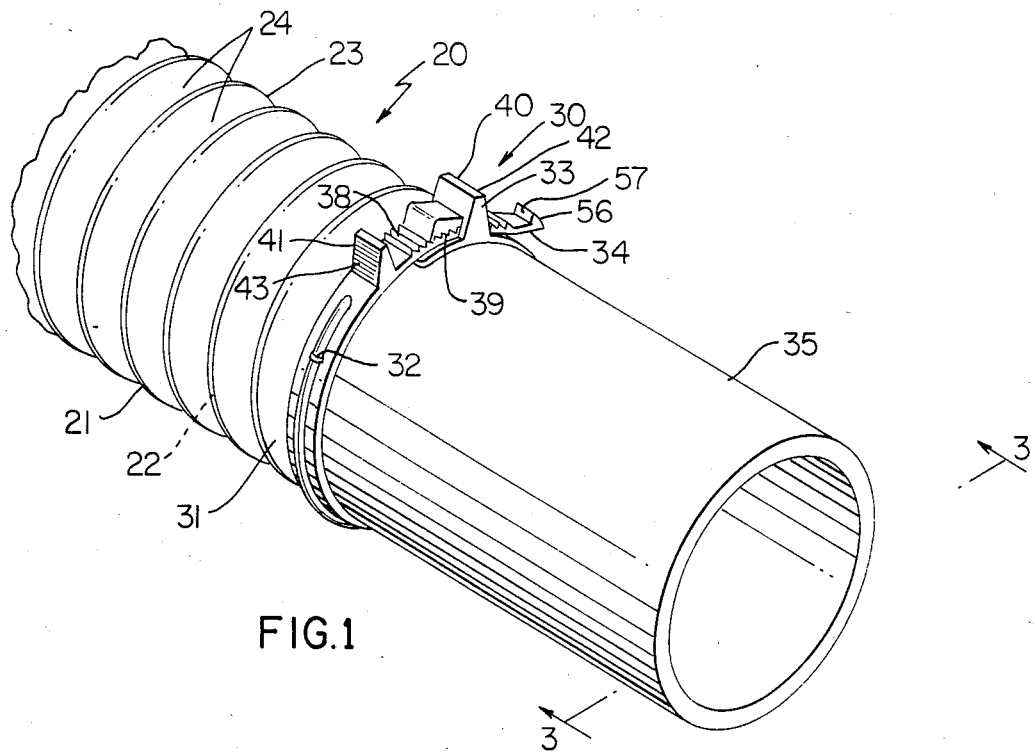
FIG. 1 is a fragmentary perspective view of the improved hose construction of this invention secured onto a member telescoped into one end of the hose construction.

While the various features of this invention are hereinafter illustrated and described as providing a hose construction for automotive purposes, it is to be understood that the various features of this invention can be used singly or in any combination thereof to provide a hose construction for other apparatus as desired.

Therefore, this invention is not to be limited to only the embodiment illustrated in the drawings, because the drawings are merely utilized to illustrate one of the wide variety of uses of this invention.

Referring now to FIG. 1, the improved hose construction of this invention is generally indicated by the reference numeral 20 and comprises a hose 21 made primarily of polymeric material and having a reinforcing wire means 22 helically wound along the length of the same in a conventional manner for making a flexible hose such as for use in the heat exchanger system of an internal combustion engine for a transportation vehicle or the like whereby the resulting hose 21 has a plurality of convolutions 23 comprising a plurality of valleys 24 and crests 25 extending along the same in a conventional manner, the crests 25 being defined where the reinforcing wire means 22 is located within the polymeric material of the hose 21 in a conventional manner.

Figure 7:
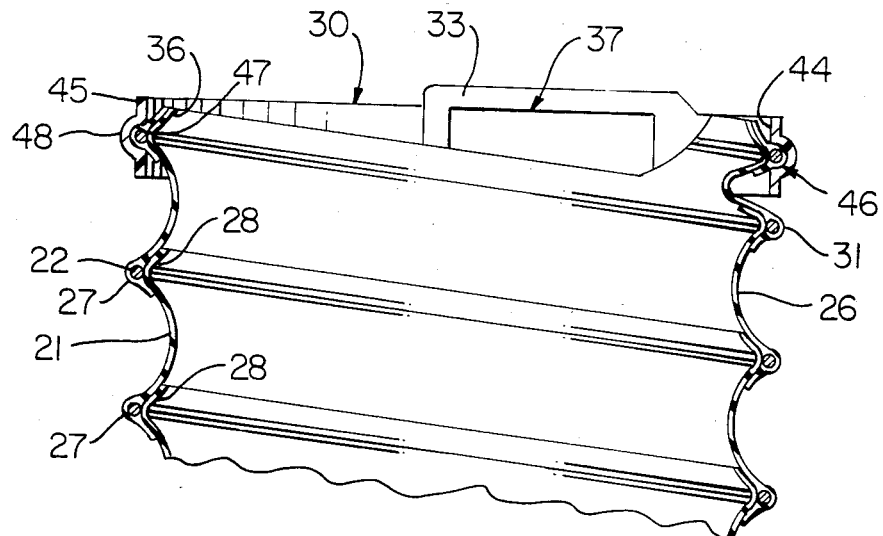
FIG. 7 is an enlarged fragmentary cross-sectional view taken on line 7—7 of FIG. 3.
Figure 8:
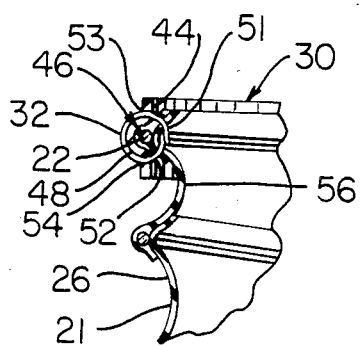
FIG. 8 is an enlarged fragmentary cross-sectional view taken on line 8—8 of FIG. 3.

For example, it can readily be seen in FIGS. 7 and 8 that the hose 21 is formed by helically winding a strip 26 of polymeric material on itself together with the reinforcing wire means 22 so that the reinforcing wire means 22 is disposed between overlapping ends 27 and 28 of the polymeric strip 26 which are secured together by suitable adhesive means or the like.

However, it is to be understood that other types of hoses can be utilized, as desired, as will be apparent hereinafter.

The hose construction 20 of FIG. 1 includes a hose clamp structure that is generally indicated by the reference numeral 30 and that is connected to the hose 21 at one end 31 thereof by fastening means 32 in a manner hereinafter set forth, the hose clamp structure 30 comprising a one-piece member formed of any suitable material, such as a polymeric material, having opposed ends 33 and 34 adapted to be interconnected together in a manner hereinafter set forth to secure the hose construction 20 onto a tubular member 35 telescoped within the end 31 of the hose 21 by tightly engaging a substantially annular portion 36 of the hose 21 that is disposed under the hose clamp structure 30 tightly around the member 35 as the resulting annular clamp structure 30 is likewise being tightened around the annular portion 36 of the hose 21 in a conventional manner.

The hose clamp structure 30 basically comprises a prior known hose clamp structure wherein the end 34 is adapted to be laced through an opening means 37 of the end 33 so as to have teeth-like means 38 on the end 34 interlock with teeth-like means 39 on the end 33 in a ratchet-like manner.

Figure 3:
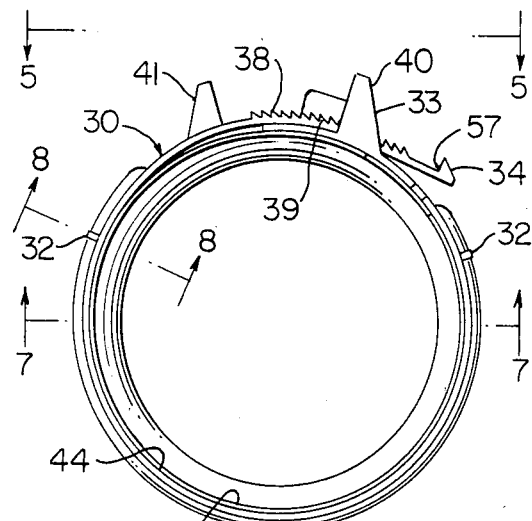
FIG. 3 is an end view of the hose construction of FIG. 1 and is taken generally in the direction of the arrows 3—3 of FIG. 1 without having the hose construction telescoped onto a tubular member as illustrated in FIG. 1.
Figure 5:
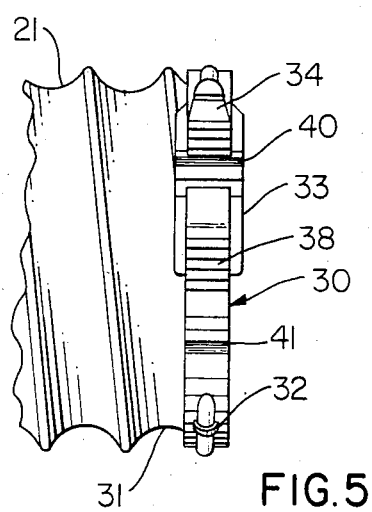
FIG. 5 is a fragmentary top view of the hose construction of FIG. 3 and is taken in the direction of the arrows 5—5 thereof.
Figure 4:
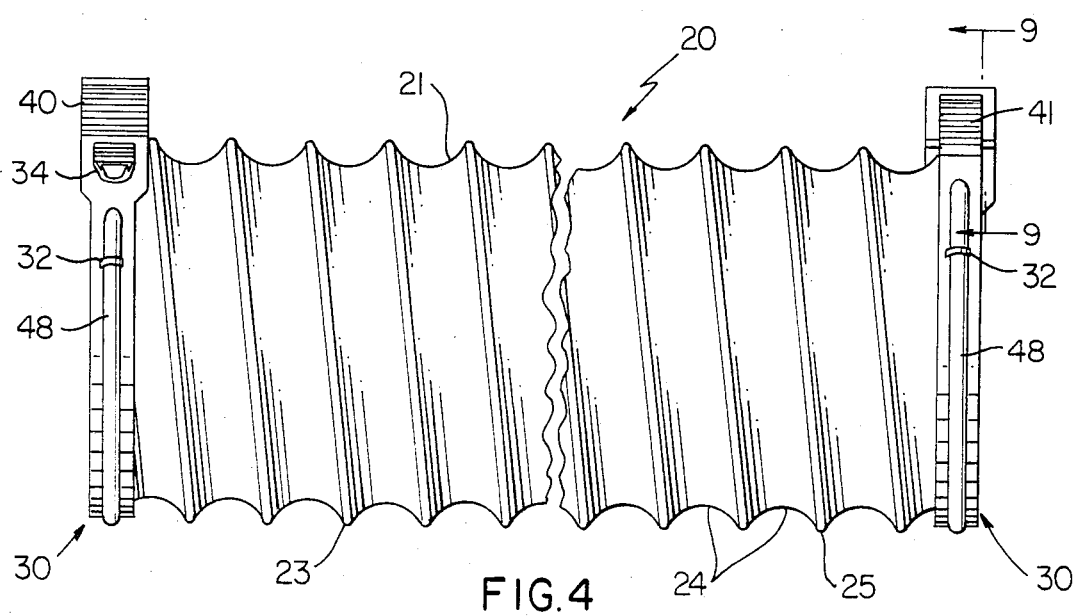
FIG. 4 is a side view of the hose construction of FIG. 1 and illustrates the hose construction with a pair of hose clamp structures respectively connected to the opposed ends of the hose thereof.
Figure 9:
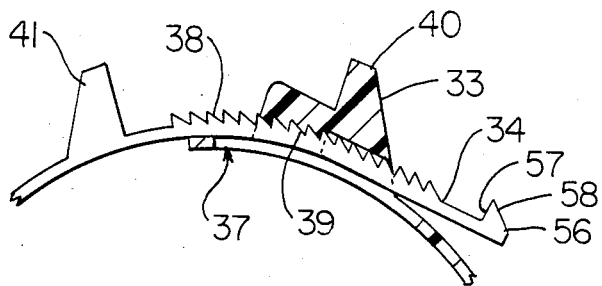
FIG. 9 is a fragmentary cross-sectional view taken on line 9—9 of FIG. 4 and illustrates the opposed ends of the hose clamp structure in their interlocked condition.

In particular, the teeth-like means 38 and 39 are so constructed and arranged that the same ratchet relative to each other as the end 34 is being laced through the opening 37 in a tightening direction of the clamp structure 30 while interlocking together when an attempt is made to unlace the end 34 from the opening 37 of the end 33 as the normal resiliency of the hose clamp structure 30 is to cause the end 34 to move outwardly relative to the end 33 so that the teeth-like means 38 and 39 are interlocked together as illustrated in FIG. 3.

In addition, the ends 33 and 34 of the hose clamp structure 30 have outwardly extending projections 40 and 41 which provide surfaces 42 and 43 to be engaged by a person's fingers and be pushed toward each other during the lacing of the end 34 through the opening means 37 of the end 33 in a clamp tightening direction of the hose clamp structure 30 about the telescoped member 35 so as to permit sufficient tightening pressure to substantially seal the end 31 of the hose construction 20 onto the tubular member 35.

However, the hose clamp structure 30 is adapted to be readily releasable from its clamped position as illustrated in FIGS. 1 and 3 in a manner hereinafter set forth.

While it has been heretofore proposed that the hose clamp structure 36 previously described is to be secured to a hose, such as the hose 21 previously described, by stapling, stitching, etc., such as set forth in the copending patent application Ser. No. 327,990, filed Dec. 7, 1981, now U.S. Pat. No. 4,453,289, wherein the securing means secures the hose clamp structure 30 to part of the reinforcing wire means 22 of the hose 21, it was found according to the teachings of this invention that such securing method will be readily facilitated if the hose clamp structure is provided with a groove means therein which presents a trough facing toward the hose 21 so as to nestably receive part of the reinforcing wire means 22 therein so that the fastening means 32 can then fasten that nested part of the reinforcing wire means 22 to the hose clamp structure 30 and thereby effectively connect the hose clamp structure 30 to the hose 21.

Figure 2:
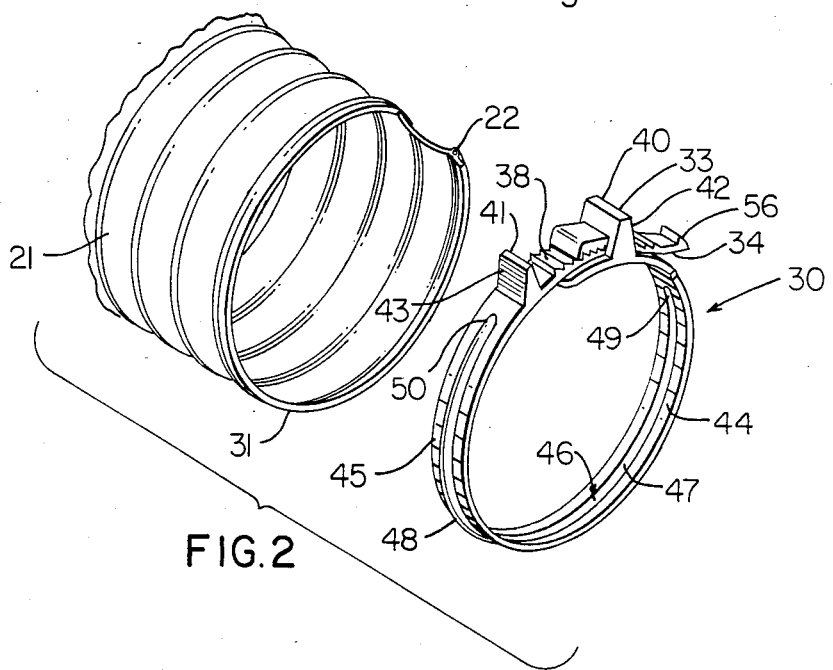
FIG. 2 is a fragmentary exploded perspective view illustrating the hose and hose clamp structure of the hose construction of FIG. 1.

In particular, it can readily be seen in FIG. 2 that the hose clamp structure 30 has an inside surface 44 and an outside surface 45 in which a groove means that is generally indicated by the reference numeral 46 is formed so that the resulting trough 47 of the groove means 46 is in the inside surface 44 of the hose clamp structure 30 and the resulting rib 48 of the groove means 46 projects outwardly from the outer surface 45 of the hose clamp structure 30, the groove means 46 respectively having opposed ends 49 and 50 disposed closely adjacent the opposed ends 33 and 34 of the hose clamp structure 30 as illustrated. Such groove means 46 can be formed at the same time the hose clamp structure is being formed, such as by a molding thereof.

In this manner, it can be seen that when the hose clamp structure 30 is to be initially secured to the hose 21 by telescoping the hose clamp structure 30 over the end 31 thereof, the end 31 of the hose 21 having been cut in the manner illustrated in FIG. 7, the wire reinforcing means 22 adjacent the end 31 will be nestably received in the trough 47 of the groove means 46 substantially completely from one end 49 of the trough 47 to the other end 50 thereof. The fastening means 32 can then fasten through the hose clamp structure 30 and around the wire reinforcing means 22 as illustrated in FIG. 8 closely adjacent the ends 49 and 50 of the groove means 46 to secure the hose clamp structure 30 to the hose 21 in an effective manner. The wire reinforcing means 22 extends in the trough 47 all the way from one fastening member 32 to the other fastening member and is locked within that trough 47 between those fastening members 32 in a unique manner to hold the hose clamp structure 30 in the desired position thereof on the hose 21.

While each fastening member 32 can comprise any suitable structure, the same comprises a metal stitch which has opposed ends 51 and 52 that respectively form a pair of opening means 53 and 54 through the hose clamp structure 30 on opposite sides of the rib means 48 and subsequently overlap each other as illustrated in FIG. 8 against the inside surface 55 of the hose 21 in an effective manner so that the fastening member 32 completely surrounds a part of the hose clamp structure 30 and a nested part of the wire reinforcing means 22 and hose 21 to firmly secure the same together.

However, it is to be understood that the fastening means 32 can comprise other fastening means as desired.

In any event, it can be seen that when the fastening means 32 if being formed by a stapling or stitching operation, the rib means 48 of the hose clamp structure 30 readily permits an installer to locate where the fastening member 32 is to be inserted through the hose clamp structure 30 in order to capture the nesting part of the reinforcing wire means 22 in the trough 47 of the assembled hose clamp structure 30.

It is usually desired to secure the hose clamp structure 30 onto the end 31 of the hose 21 while the ends 33 and 34 of the hose clamp structure 30 are in their interengaged condition so as to prevent the end 34 from accidentally being secured under the end 33 by the fastening means 32 being utilized adjacent the end 33 in the manner previously described. Of course, during such securement of the hose clamp structure 30 onto the end 31 of the hose 21, the laced ends 33 and 34 of the hose clamp structure 30 are not in their fully tightened condition so as to permit the hose clamp structure 30 to be properly positioned on the end 31 of the hose 21.

However, it has been found that even though the hose clamp structures 30 previously described are initially arranged in their annular manner by having the end 34 laced through the end 33 of each hose clamp structure 30, sometimes the end 34 becomes unlaced from its cooperating end 33 during handling of the respective hose clamp structure so that there is a likelihood that an unlaced end 34 of the hose clamp structure 30 will be accidentally secured under the other end 33 thereof during the fastening operation of that hose clamp structure 30 onto the end 31 of the hose 21.

Accordingly, it is a feature of this invention to tend to prevent such accidental unlacing of the end 34 of the hose clamp structure 30 from the end 33 of that hose clamp structure 30.

In particular, it was found according to the teachings of this invention that the end 34 of the hose clamp structure 30 could be provided with a projection 56 at the outer end thereof with the projection 56 extending in a generally radially outwardly direction relative to the hose 21 to lock in an abutting manner with the end 33 to tend to prevent unlacing of the end 34 from the opening means 37 of the end 33 in a generally circumferential direction relative to the hose 21.

Figure 11:
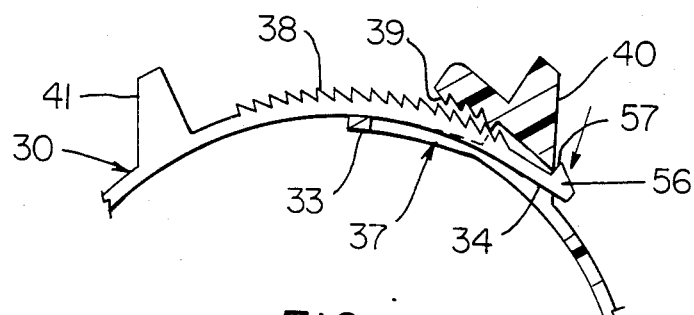
FIG. 11 is a view similar to FIG. 10 and illustrates another step in the method of unlocking the hose clamp structure of this invention.

For example, the projection 56 defines a flat locking surface 57 that is disposed substantially radially outwardly relative to the hose 21 so as to abut against the projection 40 of the end 34 as illustrated in FIG. 11 when the end 34 is pulled in a generally circumferential unlacing direction relative to the end 33 in a manner hereinafter set forth.

The projection 56 has a flat cam surface 58 which is angled relative to the flat locking surface 57 at an acute angle relative thereto to facilitate the lacing of the end 34 through the opening means 37 of the end 33 in a manner hereinafter set forth.

Therefore, it can be seen that it is a relatively simple method of this invention to modify the hose clamp structure 30 to include the groove means 46 of this invention and/or the locking tab or projection 56 so that the hose clamp structure 30 of this invention will function in the following manner.

When it is desired to secure a hose clamp structure 30 of this invention to the end 31 of the hose 21, the clamp structure 30 has the end 34 thereof laced through the opening 37 of the end 33 thereof by permitting the projection 56 to have its cam surface 58 assist in such threading operation until the end 34 is sufficiently through the opening 37 so as to dispose the locking tab 56 on the other side of the projection 40 of the end 33 in much the same manner as illustrated in FIG. 11 and, if desired, the end 34 can be further moved in a locking direction in order to interlock certain of its teeth-like means 38 with the teeth-like means 39 of the end 33 without causing the diameter of the closed clamp structure 30 to be smaller than the end 31 of the hose construction 21.

In any event, the closed annular hose clamp structure 30 is slipped on the end 31 of the hose 21 in such a manner that the reinforcing wire means 22 is snap-fitted into the trough 47 of the groove means 46 from one end 49 thereof to the other end 50 and then the fastening means 32 are utilized to fasten the hose clamp structure 30 to the hose end 31 in the manner previously described. For example, a conventional stapling apparatus utilized to insert the fastening members 32 through the hose clamp structure 30 can be so positioned that the same will cause each fastening member 32 to straddle the rib 48 on the side 45 of the clamp structure 30 and insure that the fastening member will completely surround the reinforcing wire means 22 disposed in the groove 46 in the manner illustrated in FIG. 8.

Once the hose clamp structure 30 has been secured to the hose 21 in the manner previously described, the resulting hose construction 20 can be telescoped onto a desired tubular member, such as the tubular member 35 illustrated in FIG. 1, and be fastened thereto by the person placing his fingers or a suitable tool against the projections 40 and 41 of the hose clamp structure 30 at the surfaces 42 and 43 thereof and moving those projections 40 and 41 toward each other to further lace the end 34 of the hose clamp structure 30 through the end 33 in an interlocking direction as the teeth-like means 38 ratchet over the teeth-like means 39 so that the resulting annular band being defined by the clamp structure 30 will compress the annular portion 36 of the hose 21 tightly around the tubular member 35 to completely lock the same thereon in a manner well known in the art by the teeth-like means 38 interlocking with the teeth-like means 39 when the projections 40 and 41 are released and the end 34 tries to unlace from the end 33.

Figure 10:
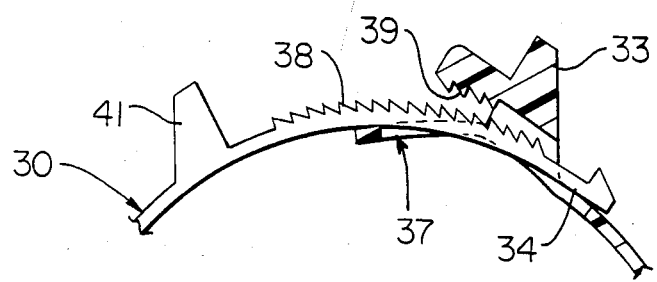
FIG. 10 is a view similar to FIG. 9 and illustrates one step in the method of unlocking the hose clamp structure of this invention.
Figure 12:
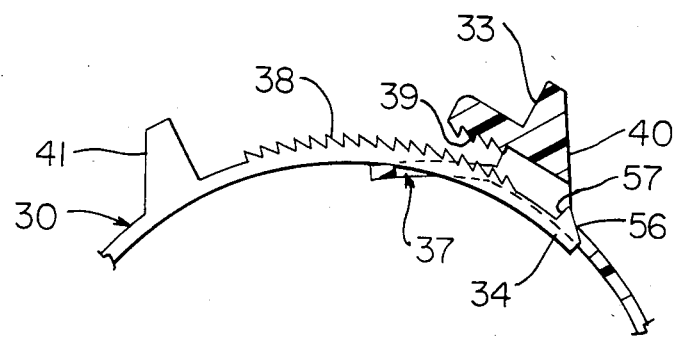
FIG. 12 is a view similar to FIG. 11 and illustrates another step in the method of opening the hose clamp structure of this invention.

When it is desired to release the hose construction 20 from the tubular member 35, the hose clamp structure 30 can be opened in the manner illustrated in FIGS. 10-12.

Figure 6:
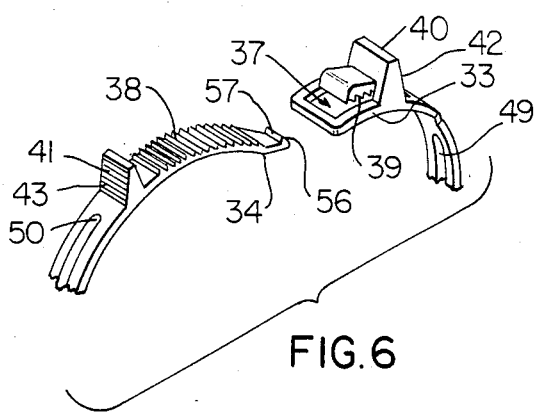
FIG. 6 is a fragmentary perspective view illustrating the hose clamp structure of the hose construction of FIG. 1 with the opposed ends of the hose clamp structure thereof disposed in a fully open condition.

In particular, by pulling downwardly on the end 34 and upwardly on the end 33 as illustrated in FIG. 10, it can be seen that the teeth-like means 38 on the end 34 will be unlocked from the teeth-like means 39 of the end 33 so that the same can be moved relative to each other in an unlacing direction as illustrated in FIG. 11. However, when the end 34 reaches the position illustrated in FIG. 11, the locking surface 57 of the projection 56 of this invention abuts the projection 40 of the end 33 of the clamp structure 30 to prevent further movement of the end 34 in an unlacing circumferential direction. At this time, the person must push downwardly on the projection 56 as indicated by the arrow in FIG. 11 in order to have the locking surface 57 thereof clear the projection 40 and permit the locking projection 56 to be pulled out of the opening means 37 of the end 33 in the manner illustrated in FIG. 6. Of course, when the locking tab 56 has reached the position illustrated in FIG. 11, the hose clamp structure 30 is sufficiently open that the hose construction 20 can be slipped off the tubular member 35 whereby it may not be necessary to ever fully open the end 34 from the end 33.

Therefore, it can be seen that it is a relatively simple method of this invention to make the hose construction 20 by utilizing the hose clamp structure 30 of this invention that has been made in accordance with the method of this invention.

Thus, this invention not only provides an improved hose construction and hose clamp structure therefor, but also this invention provides improved methods of making such a hose construction and hose clamp structure therefor.

While the forms and methods of this invention now preferred have been illustrated and described as required by the Patent Statute, it is to be understood that other forms and method steps can be utilized and still fall within the scope of the appended claims.

What is claimed is:

1. In a method of making a hose construction comprising the steps of, providing a hose made primarily of a polymeric material and having reinforcing wire means comprising a wire helically disposed along said hose, connecting a one-piece outer hose clamp structure to said hose, and forming said hose clamp structure to have two ends which when interconnected together define an annular band around said hose and are adapted to secure said hose onto a member telescoped in said hose by tightly engaging a substantially annular portion of said hose around said member, the improvement comprising the steps of forming said hose clamp structure with groove means therein, nestably disposing part of said reinforcing wire means in said groove means, and securing said part of said reinforcing wire means to said hose clamp structure with two fastening members so that said fastening members connect said hose clamp structure to said hose, said securing step further comprising the step of disposing said two fastening members respectively adjacent said opposed ends of said hose clamp structure, said forming step further comprising the step of extending said groove means at least from one of said fastening members to the other of said fastening members, and said disposing step further comprising the step of nestably receiving said part of said reinforcing wire means in said groove means from at least said one fastening member to said other fastening member.

2. A method of making a hose construction as set forth in claim 1 and including the step of forming each fastening member surrounds said part of said reinforcing wire means and a part of said hose clamp structure.

3. A method of making a hose construction as set forth in claim 2 and including the step of forming each said part of said hose clamp structure to include part of said groove means.

4. A method of making a hose construction as set forth in claim 3 and including the steps of forming each said part of said hose clamp structure with a pair of openings therethrough on opposite sides of its respective said part of said groove means, and disposing parts of each said one fastening member respectively in said openings.

5. A method of making a hose construction as set forth in claim 4 and including the steps of forming each said fastening member to comprise a stitch means.

6. A method of making a hose construction as set forth in claim 4 and including the steps of forming said hose clamp structure to have inside surface means and outside surface means, forming said groove means to define trough means in said inside surface means of said hose clamp structure and outwardly projecting rib means on said outside surface means of said hose clamp structure, and disposing said openings on opposite sides of said rib means.

7. A method of making a hose construction as set forthin in claim 6 and including the steps of forming said hose clamp structure to comprise a one-piece member having opposed ends that respectively define said two ends, causing said one-piece member to define an annular clamping band around said hose when said two ends are interconnect together, and disposing said groove means having opposed ends respectively inboard of said opposed ends of said hose clamp structure.

8. A method of making a hose construction as set forth in claim 7 and including the step of forming said two fastening members respectively by disposing said opposed ends inboard of said groove means.

9. A method of making a hose construction as set forth in claim 1 and including the step of forming part of said reinforcing wire means to snap-fit into said groove means.

10. A method of making a hose construction as set forth in claim 9 and including the steps of forming one of said two ends of said hose clamp structure to have an opening means therethrough and teeth-like means adjacent said opening means, lacing the other of said two ends of said hose clamp structure through said opening means in a generally circumferential direction relative to said hose, and causing teeth-like means of said other end to interlock in a ratchet-like manner with said teeth-like means of said one end to interconnect said ends together.

11. A method of making a hose construction as set forth in claim 10 and including the step of forming said other end of said hose clamp structure to have a projection extending in a generally radially outwardly direction relative to said hose to lock in an abutting manner with said one end to tend to prevent unlacing of said other end from said opening means in said circumferential direction.

12. A method of making a hose construction as set forth in claim 11 and including the step of forming said projection to have a locking surface that is disposed substantially radially outwardly relative to said hose to abut said one end when said other end is pulled in said circumferential direction to tend to unlace the same from said one end.

* * * * *